United States Patent
Bielke et al.

(10) Patent No.: US 10,414,566 B2
(45) Date of Patent: Sep. 17, 2019

(54) STAND-UP PLASTIC STORAGE BAG WITH REINFORCED BOTTOM GUSSET

(71) Applicant: Inteplast Group Corporation, Livingston, NJ (US)

(72) Inventors: Garth Bielke, New Braunfels, TX (US); Sompop Teeranukool, Chonburi (TH)

(73) Assignee: Inteplast Group Corporation, Livingston, NJ (US)

(*) Notice: Subject to any disclaimer, the term of this patent is extended or adjusted under 35 U.S.C. 154(b) by 0 days.

(21) Appl. No.: 15/678,574

(22) Filed: Aug. 16, 2017

(65) Prior Publication Data
US 2019/0055072 A1   Feb. 21, 2019

(51) Int. Cl.
| | |
|---|---|
| *B65D 75/00* | (2006.01) |
| *B29C 48/00* | (2019.01) |
| *B29C 48/08* | (2019.01) |
| *B29C 48/21* | (2019.01) |
| *B65D 33/02* | (2006.01) |

(Continued)

(52) U.S. Cl.
CPC ........ *B65D 75/008* (2013.01); *B29C 48/0019* (2019.02); *B29C 48/0021* (2019.02); *B29C 48/0022* (2019.02); *B29C 48/08* (2019.02); *B29C 48/21* (2019.02); *B65D 33/02* (2013.01); *B29K 2023/0625* (2013.01);

(Continued)

(58) Field of Classification Search
CPC .............................. B65D 75/008; B65D 33/02
USPC .......................... 383/104, 119–122
See application file for complete search history.

(56) References Cited

U.S. PATENT DOCUMENTS 2,334,410 A * 11/1943 Hume ...................... A45C 3/06
                                                               150/127
3,006,257 A * 10/1961 Orsini ...................... B31B 70/00
                                                               156/267

(Continued)

FOREIGN PATENT DOCUMENTS

GB           2038777 A  *  7/1980  ............. B65D 33/02

*Primary Examiner* — Jes F Pascua
(74) *Attorney, Agent, or Firm* — Stinson LLP (57) ABSTRACT

A stand-up plastic food storage bag having two bottom gusset walls and a folding seam defining abutment of the front bottom gusset wall to the rear bottom gusset wall. There are gusset wall reinforcement layers on an external surface of the bottom gusset walls, and these reinforcement layers terminate at least about 0.25 cm away from the folding seam, and do not cover the folding seam, so they do not significantly interfere with folding the seam when collapsing the bag into its storage condition. A method for forming such stand-up plastic food storage bags by coextruding a monolayer plastic panel film and two monolayer plastic gusset floor reinforcement layers, wherein the monolayer plastic gusset floor reinforcement layers comprise two parallel strips spaced apart by at least about 0.25 cm on the panel film, lengthwise in a direction of coextrusion, followed by folding the monolayer plastic panel film lengthwise to form a lengthwise fold line between the two monolayer plastic gusset floor reinforcement layers, forming a gusset in the area of the lengthwise fold line, forming seals in the plastic panel film in a direction perpendicular to the lengthwise fold line to define individual bag segments, and cutting the plastic panel film at the seals to form individual stand-up plastic food storage bags.

18 Claims, 7 Drawing Sheets

(51) Int. Cl.
 B29K 23/00 (2006.01)
 B29L 31/00 (2006.01)
 B65D 33/25 (2006.01)
(52) U.S. Cl.
 CPC ........... B29K 2023/0633 (2013.01); B29L 2031/7128 (2013.01); B65D 33/2508 (2013.01)

(56) References Cited

U.S. PATENT DOCUMENTS

| | | | | |
|---|---|---|---|---|
| 3,084,731 | A * | 4/1963 | Kugler | B65D 33/02 383/119 |
| 8,070,359 | B2 * | 12/2011 | Taheri | B29C 47/28 383/105 |
| 8,303,182 | B2 * | 11/2012 | Taheri | B29C 47/28 383/105 |
| 8,637,129 | B2 * | 1/2014 | Withers | B29C 47/0021 428/34.4 |
| 2005/0180665 | A1 * | 8/2005 | Eriksson | B65B 3/18 383/104 |
| 2008/0199643 | A1 * | 8/2008 | Withers | B29C 47/0021 428/35.2 |
| 2008/0285897 | A1 * | 11/2008 | Taheri | B29C 47/28 383/209 |
| 2010/0296755 | A1 * | 11/2010 | Eriksson | B29C 67/0044 383/12 |
| 2012/0288669 | A1 * | 11/2012 | Gatos | B29C 47/0021 428/137 |
| 2016/0096659 | A1 * | 4/2016 | Bielke | B65D 33/004 383/63 |

* cited by examiner

STAND-UP PLASTIC STORAGE BAG WITH REINFORCED BOTTOM GUSSET

FIELD OF THE INVENTION

The present invention relates to plastic bags for storage such as food storage bags and particularly to milk storage bags having an expandable bottom that allows them to stand up without external support.

BACKGROUND

Commercially available stand-up plastic storage bags for storing food products and especially for storing milk with freezer capability include bags having an expandable bottom gusset. This gusset allows the bag to stand upright in preparation for filling, when filled, when stored in a freezer; while also having a flat conformation when empty so that it can be stored flat and in an efficient stack when empty.

U.S. Pat. No. 4,837,849 shows a stand-up plastic storage bag which has three layers including an exterior preferably nylon layer, an interior preferably polyethylene layer, and a glue layer therebetween. The nylon layer is stated to have a high modulus and high heat distortion resistance to improve hot liquid stand-up stability.

U.S. Pat. No. 8,303,182 shows a plastic bag with a bottom reinforced by lateral ridges.

SUMMARY OF THE INVENTION

It is therefore an object of this invention to provide a plastic storage bag with a gusseted bottom that is reinforced to enhance the bag's stand-up stability, tear-resistance, and freeze tolerance. It is another object to provide such a plastic storage bag which has monolayer major panels, and a monolayer gusset floor reinforcement layer. And it is a further object to provide such a plastic storage bag which is free of gusset area and bottom area reinforcement ribs, which present extrusion challenges and initiation sites for formation of leaks and tears.

Briefly, therefore, the invention is directed to a stand-up plastic food storage bag, comprising a front panel, a rear panel, and a bag mouth at top edges of the front and rear panels; a front bottom gusset wall and a rear bottom gusset wall disposed between the front and rear panels at the bottom of the front and rear panels; a folding seam defining abutment of the front bottom gusset wall to the rear bottom gusset wall; a front bottom gusset wall reinforcement layer on an external surface of the front bottom gusset wall, and a rear bottom gusset wall reinforcement layer on an external surface of the rear bottom gusset wall; and wherein the bottom gusset wall reinforcement layers terminate at least about 0.25 cm away from the folding seam defining abutment between the bottom gusset walls and the bottom gusset wall reinforcement layers do not cover the folding seam.

In another aspect, the invention is directed to a method for forming such stand-up plastic food storage bags by coextruding a monolayer plastic panel film and two monolayer plastic gusset floor reinforcement layers, wherein the monolayer plastic gusset floor reinforcement layers comprise two parallel strips spaced apart by at least about 0.25 cm on the panel film, lengthwise in a direction of coextrusion, followed by folding the monolayer plastic panel film lengthwise to form a lengthwise fold line between the two monolayer plastic gusset floor reinforcement layers, forming a gusset in the area of the lengthwise fold line, forming seals in the plastic panel film in a direction perpendicular to the lengthwise fold line to define individual bag segments, and cutting the plastic panel film at the seals to form individual stand-up plastic food storage bags.

Other objects and features will be in part apparent and in part pointed out hereinafter.

BRIEF DESCRIPTION OF THE DRAWINGS

Corresponding features are given corresponding reference numerals throughout the drawings.

DETAILED DESCRIPTION OF PREFERRED EMBODIMENTS

The invention is directed to a plastic bag which comprises two abutting flat panels having an opening at one edge and sealed along other edges, such as two rectangular panels sealed along three edges with an opening at the fourth edge. In one preferred embodiment, there is a first panel and a second panel, wherein the first panel and second panel define a bag interior and an opening at an end margin of the first and second panels to permit access to the bag interior.

Figure 1:
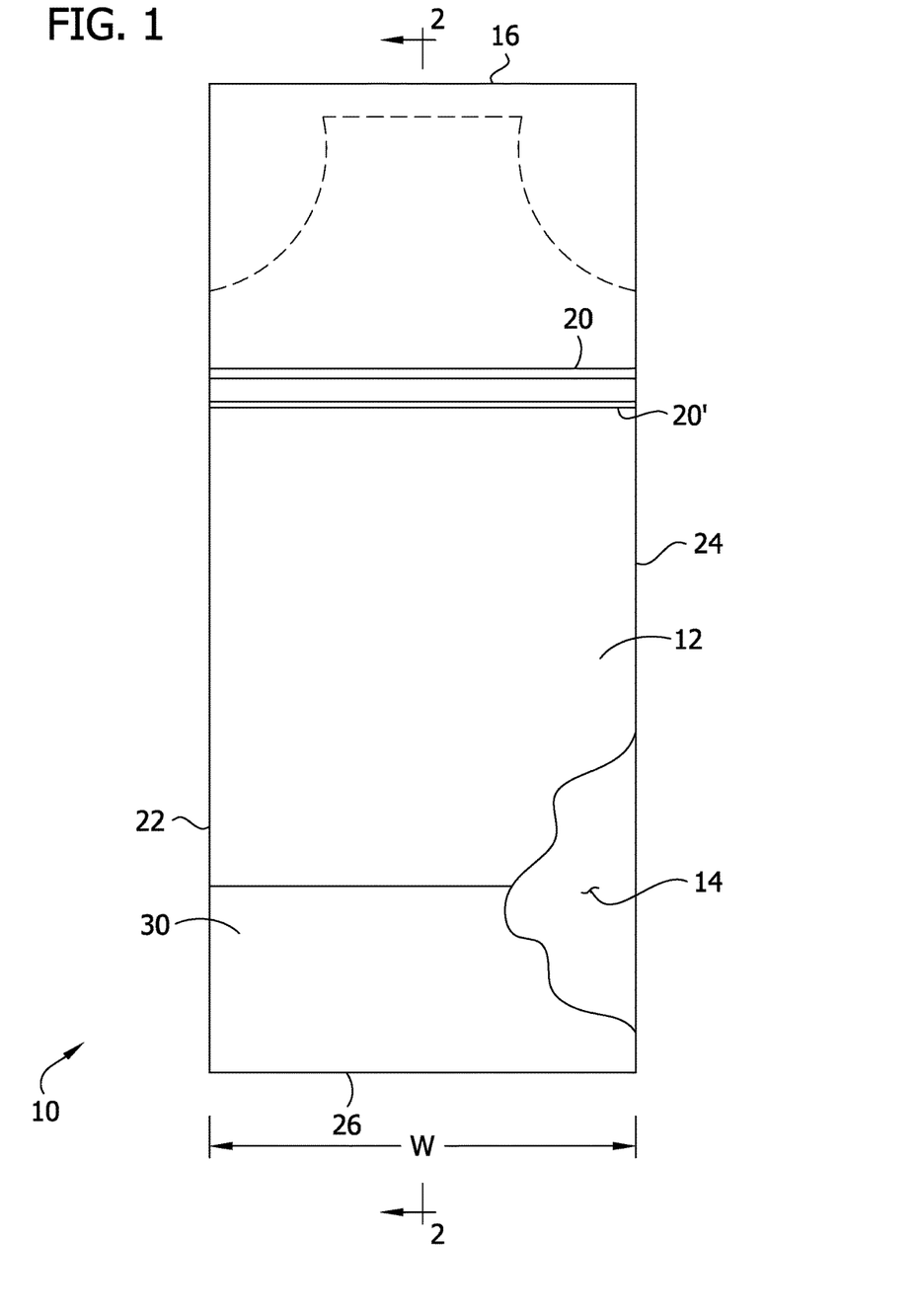
FIG. 1 is a schematic fragmentary front elevation of the plastic storage bag of the invention.

Referring to FIG. 1, one preferred bag shown at 10 is a milk bag which comprises a bag body including a first (front) panel 12 and a second (rear) panel 14. For purpose of illustration only, the lower right corner of first panel 12 is shown fragmented in phantom so that second panel 14 is visible. The first panel 12 is sealed to the second panel 14 at the left edge 22 and right edge 24. There is no seal at the top edge 16, and the panels therefore define a bag interior and a bag opening or mouth at the upper margin 16. There is no seal at the bottom edge 26, either, which instead is formed as a fold in a continuous panel, and is therefore especially leak proof. So the only sealed edges are the left and right edges. In the particular embodiment shown, the bag is a milk bag. A reclosable zipper-type closure 20, or optional double zipper-type closure as shown at 20/20', extends across the bag and is spaced apart from the end margin of the bag. Though the illustrated bag uses a reclosable seal and has a breast milk bag conformation, other types of bags having the gusset wall reinforcement mechanism described hereinbelow are within the scope of the invention.

Figure 2:
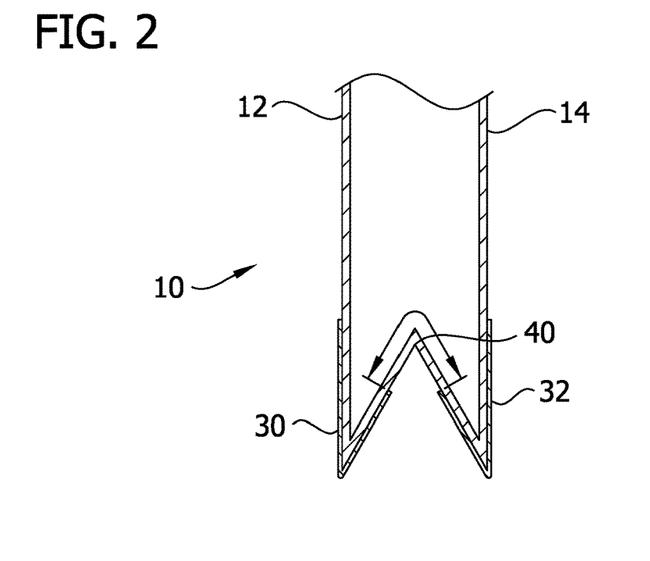
FIG. 2 is a schematic side elevation of the bag in a partially expanded condition, in cross-section taken along lines 2-2 of FIG. 1.
Figure 3:
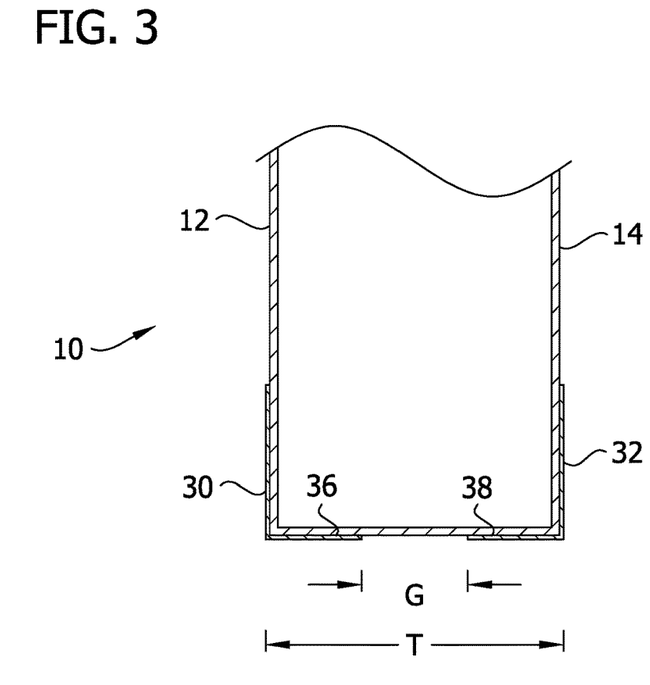
FIG. 3 is a view of the type in FIG. 2 with the bag in a nearly fully expanded condition.

FIGS. 2 and 3 show the bag 10 schematically in a cross-sectional view taken along line 2-2 in FIG. 1, when the bag is partially opened and then fully opened into its stand-up position. At the bottom of the bag is an expandable gusset not visible in FIG. 1, which is partially open in FIG.

2 and almost fully open in FIG. 3. The gusset area includes a first panel gusset reinforcement layer 30 and a second panel gusset reinforcement layer 32. The gusset panel reinforcement layers increase the thickness of the bag and utilize freeze-tolerant polymers in the gusset area to improve resistance to leaking and to freezer tear.

These respective gusset reinforcement layers are separated from each other by a gap G. The gap is formed by the fact each of the gusset reinforcement layers terminates at least about 0.25 cm from the gusset fold peak 40. This gap G has a width of at least about 0.5 cm, such as between about 0.5 and 2 cm, such as about 1 cm. The width of the gap G is at least about 5% and preferably between about 10% and about 40%, such as between about 10% and about 40%, of the total width T of the gusset floor panels 36 and 38 that form the bag floor when the gusset is in its open position as shown in FIG. 3. The front bottom gusset wall reinforcement layer 30 extends from the front bottom gusset wall onto the front panel 12; and the rear bottom gusset wall reinforcement layer 32 extends from the rear bottom gusset wall onto the rear panel 14. The distance these reinforcement layers extend up the panels 12 and 14 is between about 2 cm and about 7 cm, such as between about 3.5 and about 5 cm in one preferred embodiment, such as between about 3.8 and 4 cm. In the currently preferred embodiment, the front gusset wall reinforcement layer and rear gusset wall reinforcement layer extend the same distance up their respect front and rear panels.

Figure 4:
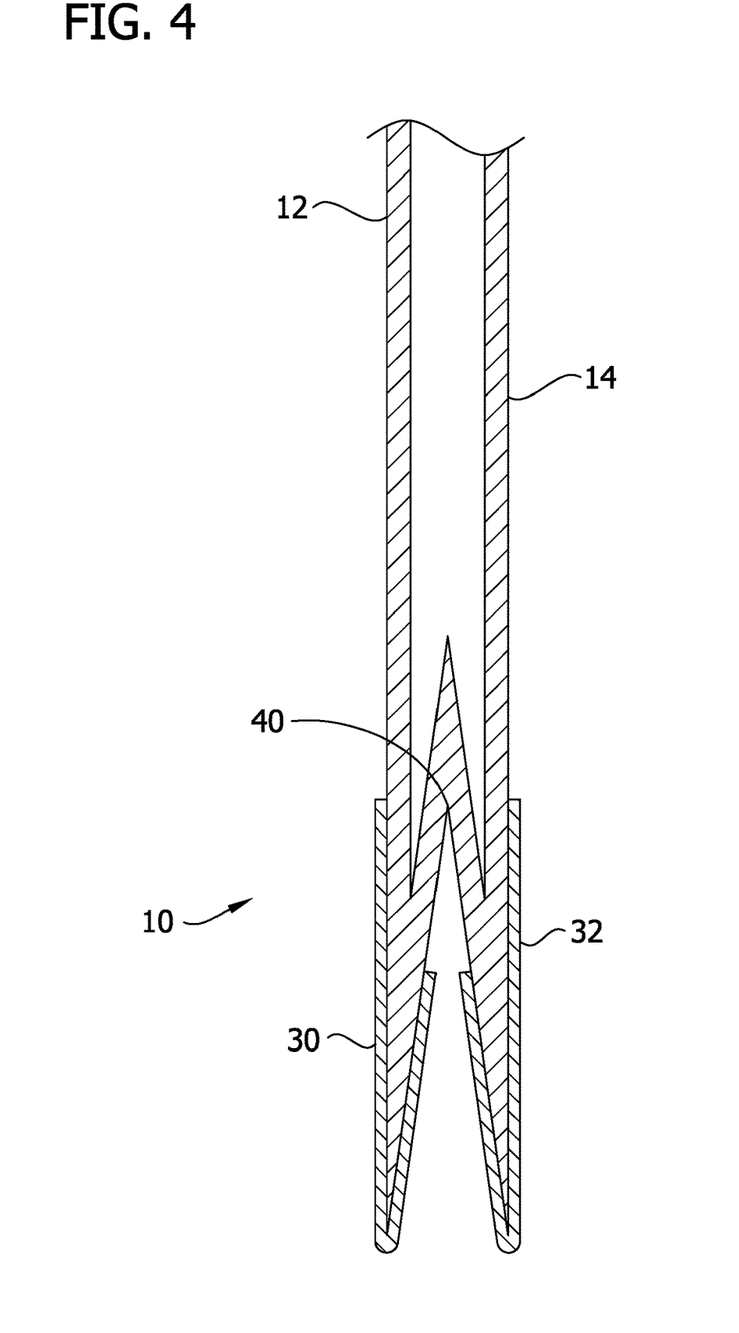
FIG. 4 is a close-up view of the cross-section of FIGS. 2 and 3 with the bag in its collapsed condition.

FIG. 4 shows the bag 10 in its empty and collapsed condition for storage. Due to the appreciable size of gap G as shown in FIG. 3, it can be seen in FIG. 4 that the gusset is able to collapse to a more compact and flatter conformation than if there were no such gap. If the gusset floor reinforcement were a continuous layer across the gusset floor, the reinforcement layer in the region of the gusset fold peak 40 would interfere with collapsing of the gusset, and it would not collapse as flatly. Similarly, if the gusset floor reinforcement were to comprise two distinct layers such as applicant's first panel gusset reinforcement layer 30 and a second panel gusset reinforcement layer 32, but the gap G between the layers were too small, the reinforcement layers would interfere with collapsing of the gusset. Additionally, the gusset floor reinforcement layer does not cause any folding difficulty since it does not cover the center folding line.

In the preferred embodiment, the material from which the main bag panels 12 and 14 are extruded is different from the material from which the gusset reinforcement layers 30 and 32 are extruded. These first and second bag panels are preferably monolayers having a thickness between about 1.5 mils (1 mil=0.001 inch) and about 3.5 mils each, such as between about 2 mils and about 3 mils each. LDPE is the preferred material for the main bag panels 12 and 14. That is, these panels preferably comprise at least about 95 wt % LDPE plus optional conventional additives, such as antiblock and/or slip. The gusset panel reinforcement, in contrast, is preferably extruded from a blend of elastomer and metallocene LLDPE. Each of the first panel gusset reinforcement layer and second panel gusset reinforcement layers is preferably a monolayer which is coextruded with the main bag panels. The reinforcement layer monolayers each have a thickness between about 0.3 mil and about 1.5 mils, such as between about 0.7 mil and about 1.2 mils.

The gusset panel reinforcement layers' blend of elastomer and metallocene LLDPE comprises from about 35 to about 45 wt % elastomer, and from about 55 to about 65 wt % metallocene LLDPE. In one preferred embodiment, the elastomer is 40 wt % and the metallocene LLDPE is 60 wt %. The wt % figures herein are on an equivalent basis, as it is not necessarily possible to separately identify distinct compounds in the bag, after melting and extruding. These layers may also include optional conventional additives in small amounts, such as up to about 5 wt %.

Figure 5:
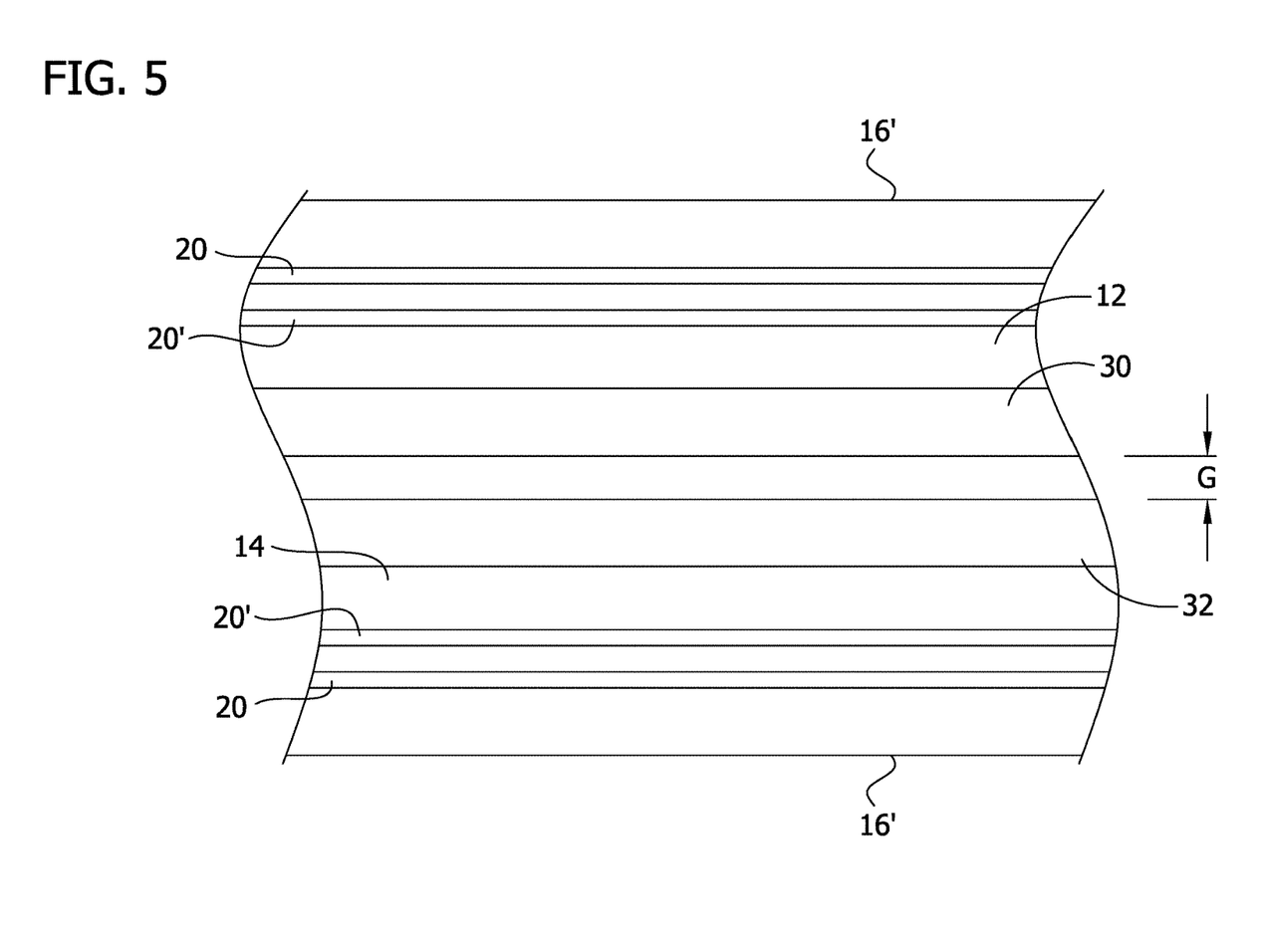
FIG. 5 is a schematic top view looking down onto a section of film after extrusion and before folding and other processing steps for forming the bag.
Figure 6:
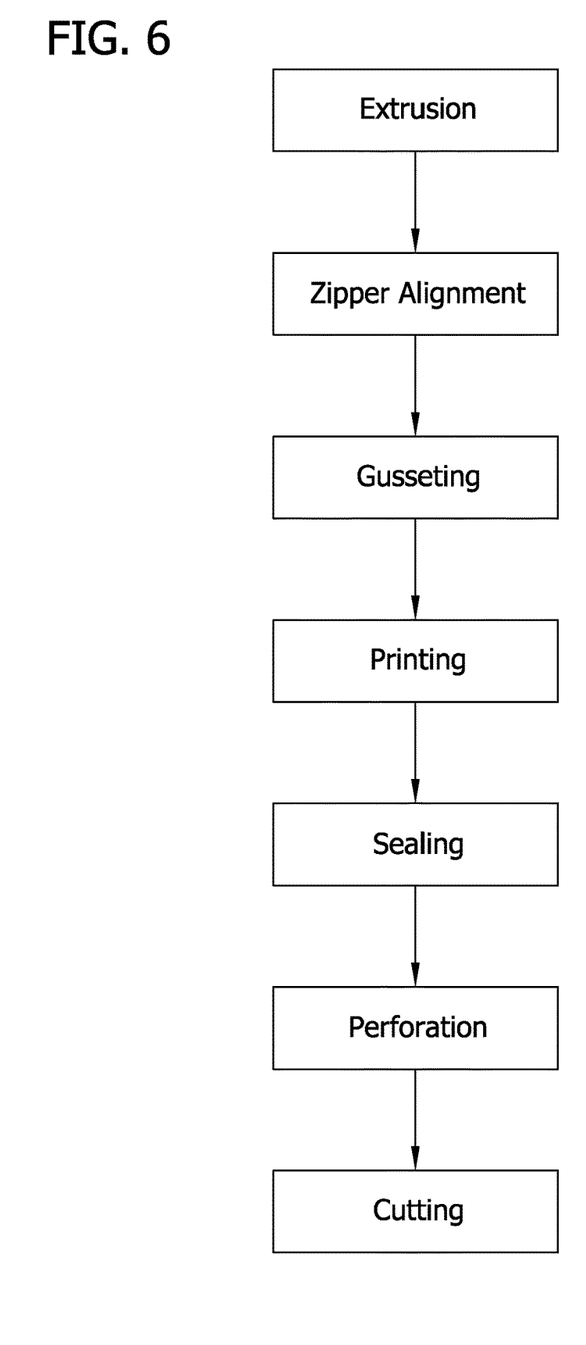
FIG. 6 is a block diagram of the method steps of the invention.

The process for forming the bag of the invention involves extruding the film such as shown in FIG. 5 which will subsequently be folded, sealed, and cut to form bags of the invention. The major process steps are depicted in the block diagram of FIG. 6. The extrusion process is conventional except that the strips of gusset floor reinforcement material are coextruded along with the major bag film material. A film is extruded as shown in FIG. 5, which is a flat monolayer film, the major surface of which defines the two panels 12 and 14. The film includes coextruded strips 30 and 32 which define gusset floor reinforcement layers in the finished bag. These strips are separated by the gap distance shown at G and discussed above. The extruded film also includes co-extruded zipper components 20 and 20'; and the outer edges 16' of the film, after folding to the bag configuration, form the bag upper edge 16 shown in FIG. 1.

After co-extrusion of the bag film, gusset floor reinforcement strips, and zipper components, the bag is folded in half lengthwise (parallel to the travel/extrusion direction) so that the zipper components line up with each other. Then the film travels over a roller which contacts the film in the land between the two strips 30 and 32 to impart a gusset in the area which will be the bottom of the eventual bag.

Figure 7:
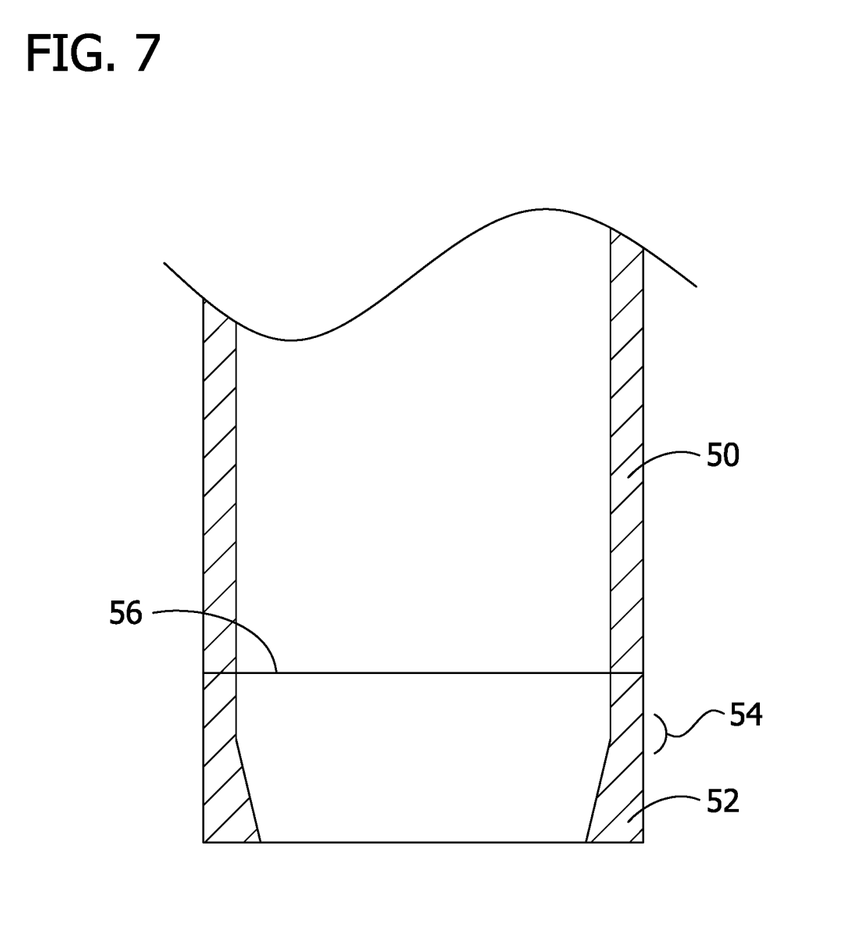
FIG. 7 is a front view of the bag of the invention enhanced to show side seals in cross-hatching.

Thereafter the bag is optionally printed. After optional printing, the bag is sealed, perforated, and cut into individual bags. The sealing operation seals panel 12 to panel 14 along lines which will eventually define sealed edges 22 and 24 in the eventual bag. The sealing is preferably by heat sealing. FIG. 7 illustrates the result of the sealing operation. There is an upper seal section 50 and a lower, exaggerated or wider seal section 52. The lower seal section is preferably a trapezoid-shaped seal having a wider section at the bag bottom than at the top of the of the lower seal section 52 where the lower seal section 52 transitions in the area 54 to the rectangular upper seal section 50. The reason for this trapezoid-shaped lower seal section that intersects the bottom edge of the bag is to increase stability and to prevent leakage in this area. Edge 56 designates the top edge of the gusset floor reinforcement panel.

After sealing, the film is subjected to perforation to impart features such as the perforation shown in FIG. 1, which allows the top to be easily removed from a new bag just before use to allow fitting to a milk pump, thus preserving sterility of the bag interior until use. And then the film is cut into individual bags by a hot knife procedure or other slicing methods known in the industry.

It can therefore be seen that the method involves coextruding a monolayer plastic panel film and two monolayer plastic gusset floor reinforcement layers, wherein the monolayer plastic gusset floor reinforcement layers comprise two parallel strips spaced apart by at least about 0.25 cm on the panel film, lengthwise in a direction of coextrusion. The subsequent method steps include folding the monolayer plastic panel film lengthwise to form a lengthwise fold line between the two monolayer plastic gusset floor reinforcement layers; forming a gusset in the area of the lengthwise fold line; forming seals in the plastic panel film in a direction perpendicular to the lengthwise fold line to define individual bag segments; and cutting the plastic panel film at the seals to form individual stand-up plastic food storage bags.

It can therefore be seen that the bags of the invention achieve high integrity reinforcement of the bag bottom and gusset area, including resistance to tearing, and especially resistance to tearing at freezer temperatures down to −20° C. Advantageously, the bags are nylon-free and glue-free, and there are no ribs on the bag bottom, lower side walls, or gusset area.

Figure 8:
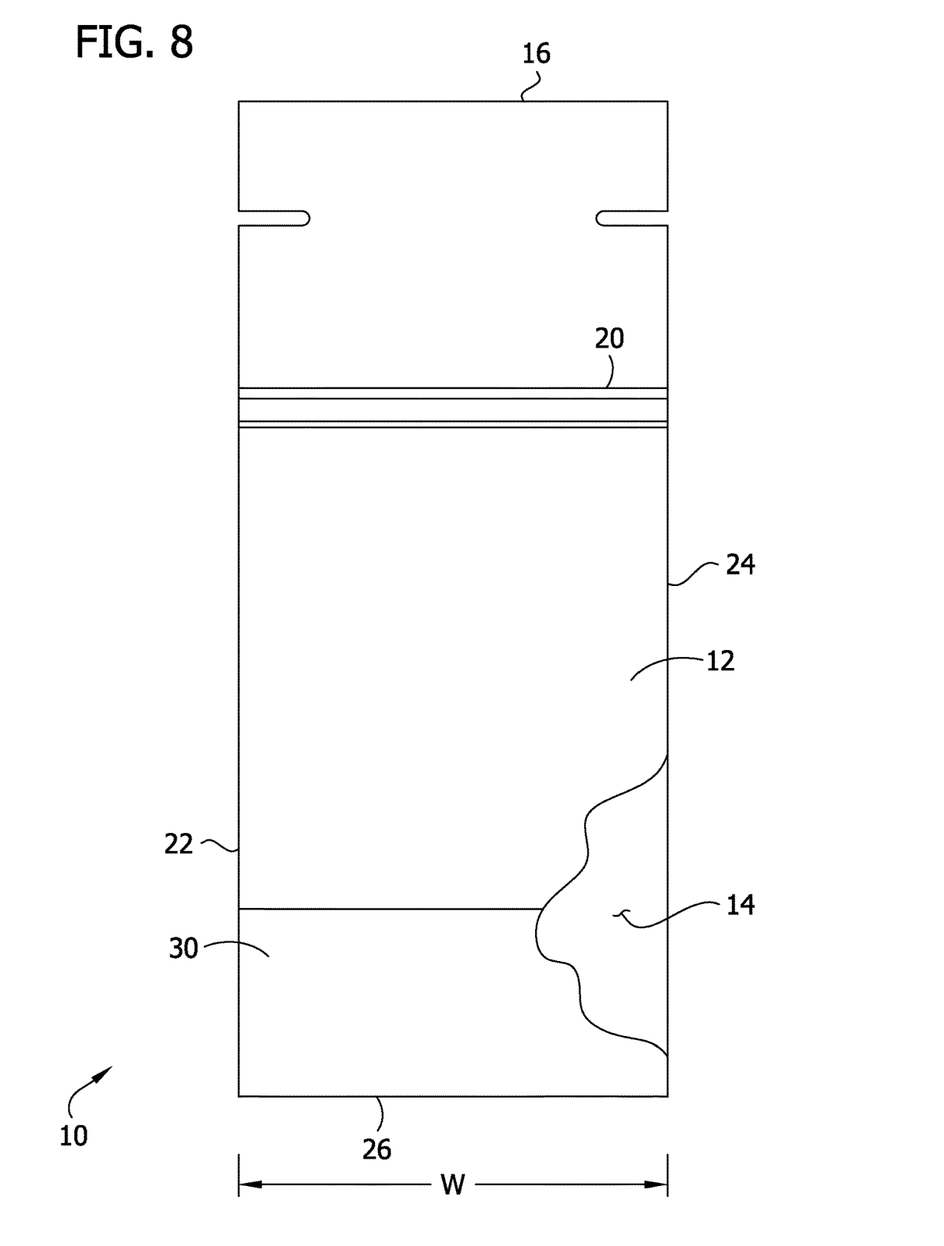
FIG. 8 is a schematic fragmentary front elevation of an alternative embodiment of the plastic storage bag of the invention with slots added to facilitate mounting to an adapter in the manner illustrated in US 2016/0114090.

FIG. 8 shows an alternative embodiment in which the bag is a milk bag having a pair of holes in the bag body for use in hanging the bag from a breast milk pump adaptor. The holes are located at an end margin of the bag body adjacent the bag opening.

Example 1

Plastic bags were prepared according to the above-described method with the following parameters: bag width: 9.7-9.9 cm; bag height: 22.5 cm; thickness of bag panels: 3 mils; thickness of gusset reinforcement layers: 0.9 mils; width of gap G: 1 cm; total width of each of the reinforcement layers: 3.9 cm including 1.5 cm on the bottom of the bag and 2.4 cm up the side wall.

The bags passed leak tests performed according ASTM D3078 Standard Test Method for Determination of Leaks in Flexible Packaging by Bubble Emission. This involves submerging the sample bag in fluid contained in the vessel within the vacuum chamber, setting the cover on the vacuum chamber, closing the outlet valve, and turning on the vacuum so that the gage rises slowly (approximately 1 in. Hg/s) to vacuum level 12.5+/−0.5 in. Hg. During the rise in vacuum, the sample is observed for leakage in the form of a steady progression of bubbles from the flexible container. If there are no bubbles observed attributable to leaks, and if no test fluid attributable to a leak is inside a specimen, the specimen passes the test.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

The invention claimed is:

1. A stand-up plastic food storage bag, comprising:
a front panel, a rear panel, and a bag mouth at top edges of the front and rear panels;
a front bottom gusset wall and a rear bottom gusset wall disposed between the front and rear panels at the bottom of the front and rear panels;
a folding seam defining abutment of the front bottom gusset wall to the rear bottom gusset wall; and
a front bottom gusset wall reinforcement layer on an external surface of the front bottom gusset wall, and a rear bottom gusset wall reinforcement layer on an external surface of the rear bottom gusset wall;
wherein the front bottom gusset wall reinforcement layer has a continuous dimension that extends down the front bottom gusset wall, over an edge between the front bottom gusset wall and the front panel, and onto the front panel by a distance between 2 and 7 cm;
wherein the bottom gusset wall reinforcement layers terminate at least about 0.25 cm away from the folding seam defining abutment between the bottom gusset walls, and the bottom gusset wall reinforcement layers do not cover the folding seam defining abutment of the front bottom gusset wall to the rear bottom gusset wall.

2. The food storage bag of claim 1:
wherein the front bottom gusset wall reinforcement layer extends from the front bottom gusset wall onto the front panel, and the rear bottom gusset wall reinforcement layer extends from the rear bottom gusset wall onto the rear panel.

3. The food storage bag of claim 1 wherein the front panel, rear panel, and gusset wall reinforcement layers are monolayers.

4. The food storage bag of claim 1 wherein the front panel and rear panel are monolayers each having a thickness between about 1.5 and about 3.5 mils.

5. The food storage bag of claim 1 wherein the front panel and rear panel are monolayers each having a thickness between about 2 and about 3 mils.

6. The food storage bag of claim 1 wherein the gusset wall reinforcement layers are monolayers each having a thickness between about 0.3 and about 1.5 mils.

7. The food storage bag of claim 1 wherein the gusset panel reinforcement layers are monolayers each having a thickness between about 0.7 and about 1.2 mils.

8. A stand-up plastic food storage bag, comprising:
a front panel, a rear panel, and a bag mouth at top edges of the front and rear panels;
a front bottom gusset wall and a rear bottom gusset wall disposed between the front and rear panels at the bottom of the front and rear panels;
a folding seam defining abutment of the front bottom gusset wall to the rear bottom gusset wall; and
a front bottom gusset wall reinforcement layer on an external surface of the front bottom gusset wall, and a rear bottom gusset wall reinforcement layer on an external surface of the rear bottom gusset wall;
wherein the bottom gusset wall reinforcement layers terminate at least about 0.25 cm away from the folding seam defining abutment between the bottom gusset walls, and the bottom gusset wall reinforcement layers do not cover the folding seam defining abutment of the front bottom gusset wall to the rear bottom gusset wall;
wherein the gusset panel reinforcement layers are monolayers comprising from about 35 to about 45 wt % elastomer and from about 55 to about 65 wt % metallocene LLDPE.

9. The food storage bag of claim 1 wherein the bag panels comprise at least about 95 wt % LDPE.

10. The food storage bag of claim 1 comprising a gap having a width of at least 0.5 cm between the front gusset wall reinforcement layer and the rear gusset wall reinforcement layer, wherein the gap covers the folding seam defining abutment of the front bottom gusset wall to the rear bottom gusset wall.

11. The food storage bag of claim 10 wherein the gap has a width of between 0.5 cm and about 2 cm.

12. A stand-up plastic food storage bag, comprising:
a front panel, a rear panel, and a bag mouth at top edges of the front and rear panels;
a front bottom gusset wall and a rear bottom gusset wall disposed between the front and rear panels at the bottom of the front and rear panels;

a folding seam defining abutment of the front bottom gusset wall to the rear bottom gusset wall; and a front bottom gusset wall reinforcement layer on an external surface of the front bottom gusset wall, and a rear bottom gusset wall reinforcement layer on an external surface of the rear bottom gusset wall;

wherein the bottom gusset wall reinforcement layers terminate at least about 0.25 cm away from the folding seam defining abutment between the bottom gusset walls, and the bottom gusset wall reinforcement layers do not cover the folding seam defining abutment of the front bottom gusset wall to the rear bottom gusset wall;

wherein the front bottom gusset wall reinforcement layer extends from the front bottom gusset wall onto the front panel, and the rear bottom gusset wall reinforcement layer extends from the rear bottom gusset wall onto the rear panel;

wherein the front panel, rear panel, and gusset wall reinforcement layers are monolayers;

wherein the gusset wall reinforcement layers are monolayers each having a thickness between about 0.3 and about 1.5 mils; and wherein the gusset panel reinforcement layers are monolayers comprising from about 35 to about 45 wt % elastomer and from about 55 to about 65 wt % metallocene LLDPE.

13. The food storage bag of claim 1:

wherein the front bottom gusset wall reinforcement layer extends from the front bottom gusset wall onto the front panel, and the rear bottom gusset wall reinforcement layer extends from the rear bottom gusset wall onto the rear panel;

wherein the front panel and rear panel are monolayers each having a thickness between about 1.5 and about 3.5 mils;

wherein the bag further comprises a gap having a width of at least 0.5 cm between the front gusset wall reinforcement layer and the rear gusset wall reinforcement layer, wherein the gap covers the folding seam defining abutment of the front bottom gusset wall to the rear bottom gusset wall.

14. The food storage bag of claim 12:

wherein the front bottom gusset wall reinforcement layer extends from the front bottom gusset wall onto the front panel, and the rear bottom gusset wall reinforcement layer extends from the rear bottom gusset wall onto the rear panel;

wherein the front panel and rear panel are monolayers each having a thickness between about 1.5 and about 3.5 mils;

wherein the gusset wall reinforcement layers are monolayers each having a thickness between about 0.3 and about 1.5 mils;

wherein the gusset panel reinforcement layers comprise from about 35 to about 45 wt % elastomer and from about 55 to about 65 wt % metallocene LLDPE;

wherein the bag panels comprise at least about 95 wt % LDPE; and wherein the bag comprises a gap having a width of at least 0.5 cm between the front gusset wall reinforcement layer and the rear gusset wall reinforcement layer, wherein the gap covers the folding seam defining abutment of the front bottom gusset wall to the rear bottom gusset wall.

15. The food storage bag of claim 14 wherein the gap has a width of between 0.5 cm and about 2 cm.

16. The food storage bag of claim 14:

wherein the front panel and rear panel are monolayers each having a thickness between about 2 and about 3 mils;

wherein the gusset wall reinforcement layers are monolayers each having a thickness between about 0.7 and about 1.2 mils.

17. The food storage bag of claim 16 wherein the gap has a width of between 0.5 cm and about 2 cm.

18. A method for forming stand-up plastic food storage bags comprising:

coextruding a monolayer plastic panel film and two monolayer plastic gusset floor reinforcement layers, wherein the monolayer plastic gusset floor reinforcement layers comprise two parallel strips spaced apart by at least about 0.25 cm on the panel film, lengthwise in a direction of coextrusion;

folding the monolayer plastic panel film lengthwise to form a lengthwise fold line between the two monolayer plastic gusset floor reinforcement layers;

forming a gusset in the area of the lengthwise fold line;

forming seals in the plastic panel film in a direction perpendicular to the lengthwise fold line to define individual bag segments; and cutting the plastic panel film at the seals to form individual stand-up plastic food storage bags, each comprising:

a front panel, a rear panel, and a bag mouth at top edges of the front and rear panels;

a front bottom gusset wall and a rear bottom gusset wall disposed between the front and rear panels at the bottom of the front and rear panels;

a folding seam defining abutment of the front bottom gusset wall to the rear bottom gusset wall; and a front bottom gusset wall reinforcement layer on an external surface of the front bottom gusset wall, and a rear bottom gusset wall reinforcement layer on an external surface of the rear bottom gusset wall;

wherein the front bottom gusset wall reinforcement layer has a continuous dimension that extends down the front bottom gusset wall, over an edge between the front bottom gusset wall and the front panel, and onto the front panel by a distance between 2 and 7 cm;

wherein the bottom gusset wall reinforcement layers terminate at least about 0.25 cm away from the folding seam defining abutment between the bottom gusset walls, and the bottom gusset wall reinforcement layers do not cover the folding seam defining abutment of the front bottom gusset wall to the rear bottom gusset wall.

* * * * *